United States Patent
Kaushik et al.

(10) Patent No.: US 12,483,902 B2
(45) Date of Patent: Nov. 25, 2025

(54) SYSTEMS AND METHODS FOR GEOLOCATION-BASED POLYGON ANALYSIS FOR TELECOMMUNICATION NETWORKS

(71) Applicant: Rakuten Symphony, Inc., Tokyo (JP)

(72) Inventors: Kundan Kumar Kaushik, Indore (IN); Anshuman Kumar, Indore (IN); Nakul Vadnere, Indore (IN); Rohit Khanwilkar, Indore (IN)

(73) Assignee: RAKUTEN SYMPHONY, INC., Tokyo (JP)

( * ) Notice: Subject to any disclaimer, the term of this patent is extended or adjusted under 35 U.S.C. 154(b) by 456 days.

(21) Appl. No.: 18/179,471

(22) Filed: Mar. 7, 2023

(65) Prior Publication Data
US 2024/0305999 A1    Sep. 12, 2024

(51) Int. Cl.
*H04W 16/18*  (2009.01)
*G06F 16/29*  (2019.01)
*H04W 4/029*  (2018.01)

(52) U.S. Cl.
CPC .......... *H04W 16/18* (2013.01); *G06F 16/29* (2019.01); *H04W 4/029* (2018.02)

(58) Field of Classification Search
CPC ........ H04W 16/18; H04W 4/029; G06F 16/29
See application file for complete search history.

(56) References Cited

U.S. PATENT DOCUMENTS

| | | | |
|---|---|---|---|
| 2006/0015814 A1* | 1/2006 | Rappaport | H04L 41/145 715/733 |
| 2016/0019465 A1* | 1/2016 | Milton | H04W 4/029 706/52 |
| 2019/0156370 A1* | 5/2019 | Harrison | H04W 4/021 |
| 2021/0354040 A1* | 11/2021 | Pollock | A63F 13/213 |
| 2024/0354681 A1* | 10/2024 | Sharma | G06Q 10/0639 |

FOREIGN PATENT DOCUMENTS

WO    WO-2020172320 A1 *   8/2020   ............. H04L 67/51

* cited by examiner

*Primary Examiner* — Congvan Tran
(74) *Attorney, Agent, or Firm* — Sughrue Mion, PLLC

(57) ABSTRACT

A method for implementing geolocation-based polygon analysis to determine network elements of a telecommunications network in a polygon-defined geolocation area, the method includes: receiving data defining the boundaries of a geolocation area; based on the received data, extracting coordinates of the at least one geolocation area; based on the extracted coordinates, determining at least one a polygon; based on geolocation data of network elements, receiving coordinates defining the geolocation of at least one network element; for each network element and for each polygon, comparing the coordinates of the at least one network element with the extracted coordinates defining the boundaries of the geolocation area; based on the comparison, determining for each polygon, that the geolocation of the at least one network element intersects with the geolocation area; based on the determination, for each polygon, outputting the at least one intersecting network element of the polygon.

20 Claims, 12 Drawing Sheets

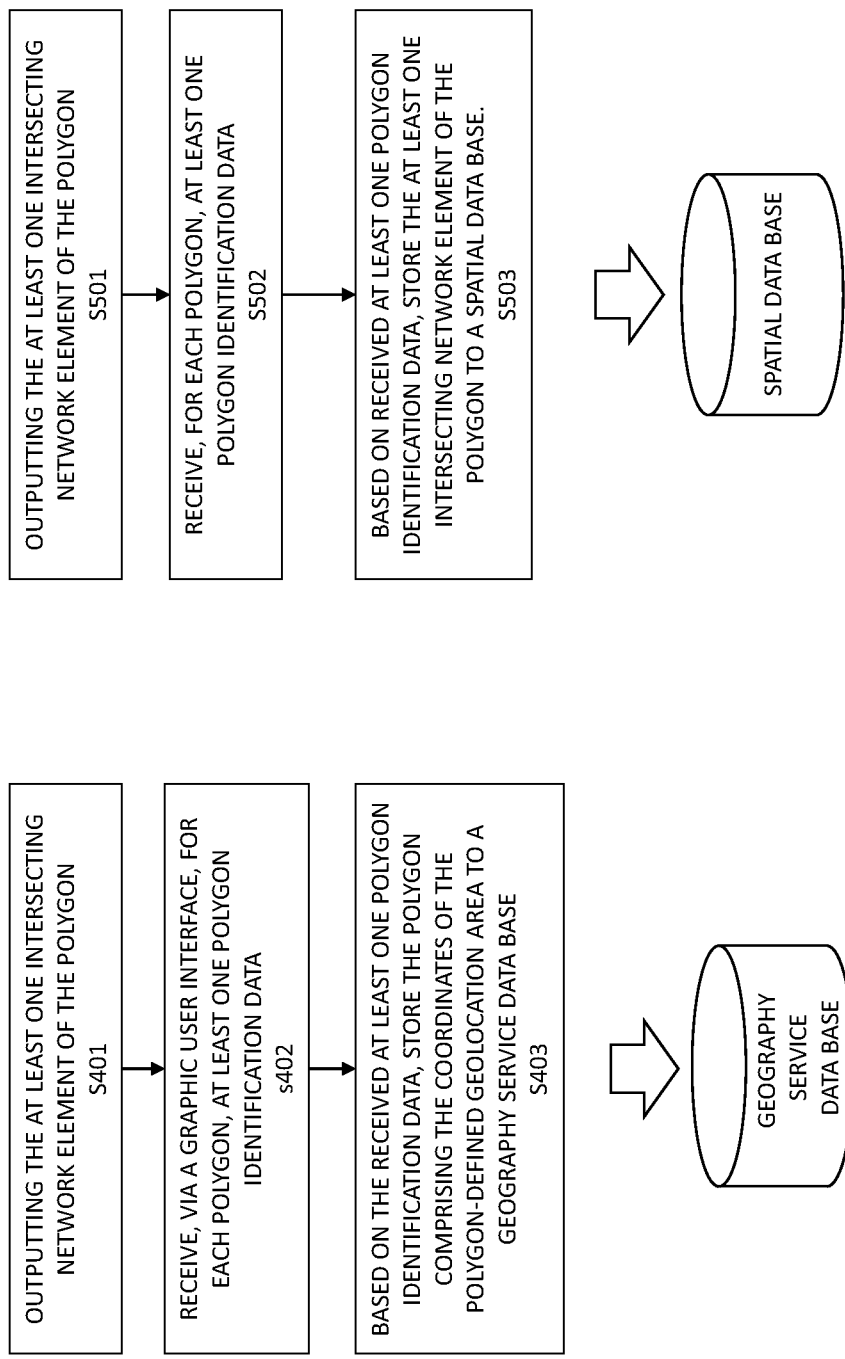

FIG. 10

SYSTEMS AND METHODS FOR GEOLOCATION-BASED POLYGON ANALYSIS FOR TELECOMMUNICATION NETWORKS

TECHNICAL FIELD

Systems and methods consistent with example embodiments of the present disclosure relate to geolocation-based polygon analysis to determine and output network elements of a telecommunications network located in a customizable polygon-defined geolocation area.

BACKGROUND

In the related art, visualization tools for network element (i.e., cell site) analysis comprise functionality that can only display all network elements located in predetermined (fixed) geolocation areas based on existing (i.e., stored or proprietary) geolocation data of a geolocation service at a time.

As a result, human interaction of users (e.g., network engineers) is needed to manually check, against geolocation data of network elements stored in a database (e.g., whether the latitude and longitude data of network elements (i.e., sites/cells) fall within a specific (freely determined) geographical area (i.e., to manually analyze all network elements of a fixed geolocation area or the whole telecommunication network (i.e., radio access network (RAN)) on whether they insect with the specific geographical area or not).

This manual process is cumbersome and time-consuming because even if only certain network elements (i.e., sites/cells) for a specific geolocation area are to be analyzed, the user needs to sequentially check the latitudes and longitudes of all network elements in the predetermined (fixed) geolocation area one by one.

To this end, the related art requires the user to process (remember and input) the latitude and longitude data of each network element (i.e., cell site) that intersects with said specific geolocation one by one in order to visualize the intersecting network element (i.e., cell site) in the context of said specific (feely determined) geolocation.

As a result, in case a user wants to visualize (analyze) network elements (sites/cells) details in a specific (freely determined) geolocation area, the related art does not allow for a dynamical adjustment to specific geolocation areas (i.e., the boundaries of specific geolocation areas (polygons)).

Moreover, in case the user wants to visualize (analyze) network elements (sites/cells) details in a specific (freely determined) geolocation area that is out of the scope of the predetermined (fixed) geolocation areas based on non-existing (i.e., not stored) geolocation data of the geolocation service, the related art does not allow to complement (add) said specific geolocation areas (i.e., the boundaries of specific geolocation areas (polygons)) to the visualization tools for the analysis of network elements.

SUMMARY

According to embodiments, systems and methods are provided for implementing geolocation-based polygon analysis to automatically determine and output network elements of a telecommunications network located in a customizable (i.e., freely determined) polygon-defined geolocation area. In particular, the systems and methods provide for extracting geolocation data of specific (freely determined) geolocation areas of polygonal shape and determine network elements intersecting with the specific geolocation areas of polygonal shape in order to allow for an automated listing (i.e., output) of network elements located in said specific geolocation areas (i.e., within the boundary of the specific geolocation areas (polygons)).

As a result, the systems and methods have the advantage that the tedious and time-consuming human interaction to manually process (determine) latitude and longitude data for network elements intersecting with specific (i.e., customizable, freely determined, etc.) geolocation areas can be automated to increase the efficiency of RAN management and that human errors in determining and listing network elements within the specific polygon-defined geolocation area can be eliminated.

According to embodiments, a system for implementing geolocation-based polygon analysis to determine network elements of a telecommunications network in a polygon-defined geolocation area, the system includes: a memory storing instructions; and at least one processor configured to execute the instructions to: based on at least one geolocation area defined by polygonal shape, receive data defining the boundaries of the polygon-defined geolocation area; based on the received data defining the boundaries of the polygon-defined geolocation area, extract coordinates of the at least one polygon-defined geolocation area; based on the extracted coordinates of the at least one polygon-defined geolocation area, determine at least one a polygon; based on geolocation data of network elements stored in a network element service database, receive coordinates defining the geolocation of at least one network element; for each network element and for each polygon, compare the coordinates of the at least one network element with the extracted coordinates defining the boundaries of the polygon-defined geolocation area; based on the comparison, determine for each polygon, that the geolocation of the at least one network element intersects with the polygon-defined geolocation area; based on the determination, for each polygon, output the at least one intersecting network element of the polygon.

While receiving the data defining the boundaries of the polygon-defined geolocation area, the at least one processor may be further configured to execute the instructions to: receive a data file may include geolocation data of the at least one polygon-defined geolocation area; extract coordinates of the at least one polygon-defined geolocation area from the geolocation data of the data file.

While receiving the data file may include geolocation data of the at least one polygon-defined geolocation area, the at least one processor may be further configured to execute the instructions to: evaluate the data file format of the received the data file may include geolocation data of the at least one polygon-defined geolocation area; determine that the data file may include geolocation data of the at least one polygon-defined geolocation area is not a Keyhole Markup Language (KML) data file; convert the geolocation data of the at least one polygon-defined geolocation area to a KML data file; extract coordinates of the at least one polygon-defined geolocation area from the geolocation data of the KML data file.

While receiving the data defining the boundaries of the polygon-defined geolocation area, the at least one processor may be further configured to execute the instructions to: receive data defining the boundaries of the polygon-defined geolocation area from a graphic user interface; extract coordinates from the received data defining the boundaries of the polygon-defined geolocation area.

While outputting the at least one intersecting network element of the polygon, for each polygon, the at least one processor may be further configured to execute the instructions to: receive, via a graphic user interface, for each polygon, at least one polygon identification data; based on the received at least one polygon identification data, store the polygon may include the coordinates of the polygon-defined geolocation area to a geography service database.

While receiving data defining the boundaries of the polygon-defined geolocation area, the at least one processor may be further configured to execute the instructions to: receive, via a graphic user interface, the at least one polygon identification data for a polygon stored in the geography service database; request the coordinates of the polygon-defined geolocation area comprised by the stored polygon from the geography service database; extract the coordinates of the polygon-defined geolocation area of the stored polygon from geography service database.

While outputting the at least one intersecting network element of the polygon, for each polygon, the at least one processor may be further configured to execute the instructions to: receive, for each polygon, at least one polygon identification data; based on the received at least one polygon identification data, store the polygon may include the coordinates of the polygon-defined geolocation area and the at least one intersecting network element of the polygon to a spatial database.

While extracting the coordinates defining the boundaries of the polygon-defined geolocation area, the at least one processor may be further configured to execute the instructions to: determine two or more polygons based on the extracted coordinates of two or more polygon-defined geolocation areas; create a separate thread for each of the two or more polygons; for each separate thread, compare, for each network element, the coordinates of the at least one network element with the extracted coordinates defining the boundaries of the polygon-defined geolocation area in the thread.

According to embodiments, a method for implementing geolocation-based polygon analysis to determine network elements of a telecommunications network in a polygon-defined geolocation area, the method includes: based on at least one geolocation area defined by polygonal shape, receiving data defining the boundaries of the polygon-defined geolocation area; based on the received data defining the boundaries of the polygon-defined geolocation area, extracting coordinates of the at least one polygon-defined geolocation area; based on the extracted coordinates of the at least one polygon-defined geolocation area, determining at least one a polygon; based on geolocation data of network elements stored in a network element service database, receiving coordinates defining the geolocation of at least one network element; for each network element and for each polygon, comparing the coordinates of the at least one network element with the extracted coordinates defining the boundaries of the polygon-defined geolocation area; based on the comparison, determining for each polygon, that the geolocation of the at least one network element intersects with the polygon-defined geolocation area; based on the determination, for each polygon, outputting the at least one intersecting network element of the polygon.

While receiving the data defining the boundaries of the polygon-defined geolocation area, the method may further include: receiving a data file may include geolocation data of the at least one polygon-defined geolocation area; extracting coordinates of the at least one polygon-defined geolocation area from the geolocation data of the data file.

While receiving the data file may include geolocation data of the at least one polygon-defined geolocation area, the method may further include: evaluating the data file format of the received the data file may include geolocation data of the at least one polygon-defined geolocation area; determining that the data file may include geolocation data of the at least one polygon-defined geolocation area is not a Keyhole Markup Language (KML) data file; converting the geolocation data of the at least one polygon-defined geolocation area to a KML data file; extracting coordinates of the at least one polygon-defined geolocation area from the geolocation data of the KML data file.

While receiving the data defining the boundaries of the polygon-defined geolocation area, the method may further include: receiving data defining the boundaries of the polygon-defined geolocation area from a graphic user interface; extracting coordinates from the received data defining the boundaries of the polygon-defined geolocation area.

While outputting the at least one intersecting network element of the polygon, for each polygon, the method may further include: receiving, for each polygon, at least one polygon identification data; based on the received at least one polygon identification data, storing the polygon may include the coordinates of the polygon-defined geolocation area and the at least one intersecting network element of the polygon to a spatial database.

While extracting the coordinates defining the boundaries of the polygon-defined geolocation area, the at least one processor may be further configured to execute the instructions to: determining two or more polygons based on the extracted coordinates of two or more polygon-defined geolocation areas; creating a separate thread for each of the two or more polygons; for each separate thread, comparing, for each network element, the coordinates of the at least one network element with the extracted coordinates defining the boundaries of the polygon-defined geolocation area in the thread.

According to embodiments, a non-transitory computer-readable recording medium having recorded thereon instructions executable by at least one processor configured to perform a method for implementing geolocation-based polygon analysis to determine network elements of a telecommunications network in a polygon-defined geolocation area, the method includes: based on at least one geolocation area defined by polygonal shape, receiving data defining the boundaries of the polygon-defined geolocation area; based on the received data defining the boundaries of the polygon-defined geolocation area, extracting coordinates of the at least one polygon-defined geolocation area; based on the extracted coordinates of the at least one polygon-defined geolocation area, determining at least one a polygon; based on geolocation data of network elements stored in a network element service database, receiving coordinates defining the geolocation of at least one network element; for each network element and for each polygon, comparing the coordinates of the at least one network element with the extracted coordinates defining the boundaries of the polygon-defined geolocation area; based on the comparison, determining for each polygon, that the geolocation of the at least one network element intersects with the polygon-defined geolocation area; based on the determination, for each polygon, outputting the at least one intersecting network element of the polygon.

While receiving the data defining the boundaries of the polygon-defined geolocation area, the method may further include: receiving a data file may include geolocation data of the at least one polygon-defined geolocation area; extracting coordinates of the at least one polygon-defined geolocation area from the geolocation data of the data file.

While receiving the data file may include geolocation data of the at least one polygon-defined geolocation area, the method may further include: evaluating the data file format of the received the data file may include geolocation data of the at least one polygon-defined geolocation area; determining that the data file may include geolocation data of the at least one polygon-defined geolocation area is not a Keyhole Markup Language (KML) data file; converting the geolocation data of the at least one polygon-defined geolocation area to a KML data file; extracting coordinates of the at least one polygon-defined geolocation area from the geolocation data of the KML data file.

While receiving the data defining the boundaries of the polygon-defined geolocation area, the method may further include: receiving data defining the boundaries of the polygon-defined geolocation area from a graphic user interface; extracting coordinates from the received data defining the boundaries of the polygon-defined geolocation area.

While outputting the at least one intersecting network element of the polygon, for each polygon, the method may further include: receiving, for each polygon, at least one polygon identification data; based on the received at least one polygon identification data, storing the polygon may include the coordinates of the polygon-defined geolocation area and the at least one intersecting network element of the polygon to a spatial database.

While extracting the coordinates defining the boundaries of the polygon-defined geolocation area, the method may further comprise: determining two or more polygons based on the extracted coordinates of two or more polygon-defined geolocation areas; creating a separate thread for each of the two or more polygons; for each separate thread, comparing, for each network element, the coordinates of the at least one network element with the extracted coordinates defining the boundaries of the polygon-defined geolocation area in the thread.

Additional aspects will be set forth in part in the description that follows and, in part, will be apparent from the description, or may be realized by practice of the presented embodiments of the disclosure.

BRIEF DESCRIPTION OF THE DRAWINGS

Features, aspects and advantages of certain exemplary embodiments of the disclosure will be described below with reference to the accompanying drawings, in which like reference numerals denote like elements, and wherein:

FIG. 4 illustrates outputting at least one intersecting network element of a polygon according to an embodiment;

FIG. 5 illustrates outputting at least one intersecting network element of a polygon according to another embodiment;

FIG. 10 illustrates a graphic user interface to select a polygon stored in a spatial database from at least one polygon identification data according to an embodiment;

DETAILED DESCRIPTION

Figure 1:
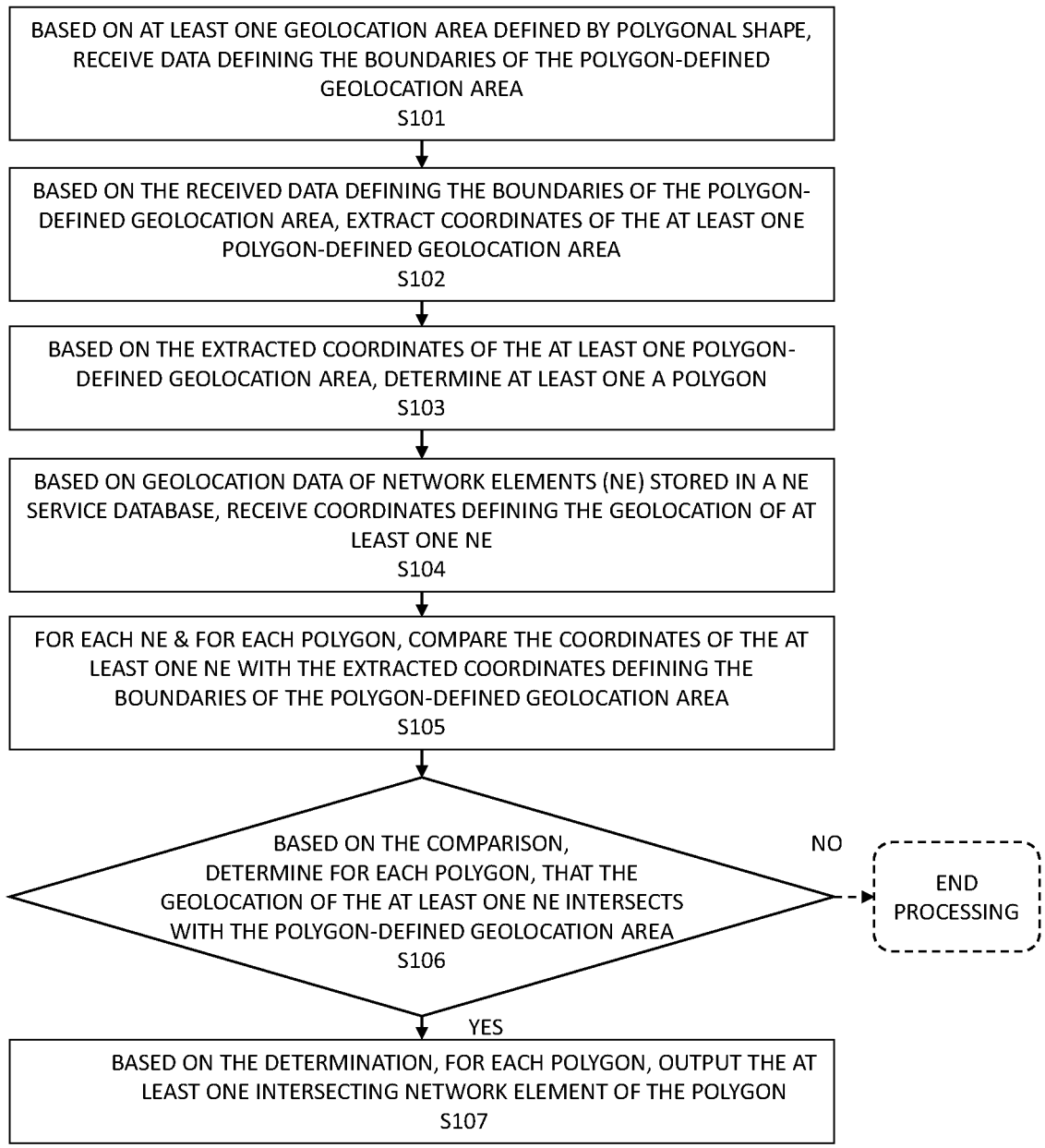
FIG. 1 illustrates a method for implementing geolocation-based polygon analysis to determine network elements of a telecommunications network in a polygon-defined geolocation area according to an embodiment.

The following detailed description of exemplary embodiments refers to the accompanying drawings. The foregoing disclosure provides illustration and description, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code. It is understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

Example embodiments of the present disclosure provide a method and system in which network elements intersecting with specific geolocation areas of polygonal shape are determined without human interaction in order to allow for an automated listing of network elements in said specific geolocation areas (i.e., within the boundaries of the specific geolocation areas (polygons)) in an efficient and reliable manner without human error.

FIG. 1 illustrates a method for implementing geolocation-based polygon analysis to determine network elements of a telecommunications network in a polygon-defined geolocation area according to an embodiment.

Referring to FIG. 1, in step S101 based on at least one geolocation area defined by polygonal shape, the system receives data defining the boundaries of the polygon-defined geolocation area. For example, a geolocation area defined by a polygonal shape may refer to any area that is defined by coordinates (e.g., longitude and latitude data) spanning a plane with a polygonal shape on a map.

In an example embodiment, the data defining the boundaries of the polygonal-defined geolocation area may be spatial data of a freely determined (drawn) geolocation area defined by a polygonal shape created by a user input via a graphical user interface of a visualization software service displaying a map.

In another embodiment, the geolocation area defined by the polygon shape may be determined by data (e.g., geolocation data such as longitude and latitude data) defining the boundaries of the geolocation area defined by a polygon.

The geolocation data may be, for example, data stored in a spatial data file such as a Keyhole Markup Language (KML) data file, wherein Keyhole Markup Language format is used to display geographic data (i.e., geolocation graphic user interface such as a geolocation browser).

Moreover, the geolocation data may be also stored in a spatial data file such as, for example, a TAB file format (i.e., a geospatial vector data format developed for geographic information system (GIS) software), a SHAPE file (*.shp) format (i.e., another geospatial vector data format for geographic information system (GIS) software), etc.

In yet another example embodiment, the data defining the boundaries of the polygonal-defined geolocation area may refer to polygon identification data defining the boundaries of the polygon-defined geolocation area of a stored polygon in a spatial database or geographic service database.

In this case, the user may select a polygon by inputting (selecting) data identifying the polygon (i.e., polygon identification data), such as the name of a geographic area to which the polygon relates, a category of the polygon (i.e., a single polygon or a plurality of polygons, such as a user-defined polygon drawn by a user on the graphical user interface (GUI) or a plurality of predetermined polygons of a data file), a source (i.e., a single GUI polygon or multiple data file polygons), a creation date, an author of the polygon, etc.

In step S102, based on the received data defining the boundaries of the polygon-defined geolocation area, the system extracts coordinates (e.g., longitude and latitude data) of the at least one polygon-defined geolocation area.

In an example embodiment, the system may extract the coordinates from data defining the boundaries of the polygon-defined geolocation area received from a GUI.

In another example embodiment, the system may extract the coordinates from a data file comprising geolocation data, for example, in geospatial vector data formats for geographic information system (GIS) software (e.g., TAB or SHAP files), in a KML format, etc.

In yet another example embodiment, the system may extract the coordinates based on the user selection of a polygon, wherein the system may retrieve (extract) the coordinates either from a spatial database or a geographic service database, based on where the geographic data defining the boundaries of the polygonal-defined geolocation area are stored.

In step S103, based on the extracted coordinates of the at least one polygon-defined geolocation area, the system determines at least one polygon. In an example embodiment, based on the extracted coordinates of the at least one polygon-defined geolocation area a single polygon or multiple polygons may be determined. In case multiple polygons are determined, the system may create separate threads for each one of the plurality of polygons for parallel processing.

To this end, for each thread, the system commences a parallel polygon-based analysis to determine the network element within the polygon (i.e., the boundaries of the polygon-defined geolocation area) according to the respective thread.

As a result, the parallel processing as set forth above allows for a time-efficient implementation of the polygon-based analysis method in case of multiple polygons (e.g., in case of batch processing multiple polygons from a data file).

In step S104, based on geolocation data of network elements stored in a network element service database, the system receives (e.g., requests or obtains periodically and/or event-triggered) coordinates defining the geolocation of at least one network element from the network element service database (e.g., a data repository of an inventory service of the telecommunication network storing inventory data of network elements comprising geolocation data such as, for example, longitude and latitude data). The geolocation data of network elements within the telecommunications network are stored in a geography service database.

For example, the geolocation data of network elements may be received by the system before or after the determination step (step S103) based on whether one or more pre-processed polygons exist (i.e., one or more polygons along with their intersecting network elements that have been processed before and were stored in a spatial database or not).

In an example embodiment, the geolocation of all network elements within the entire telecommunications network are stored in a memory of the system which allows for a fast processing of the method for implementing geolocation-based polygon analysis to determine network elements located in a polygon-defined geolocation area.

In step S105, for each network element and for each polygon, the system compares the coordinates of the at least one network element with the extracted coordinates defining the boundaries of the polygon-defined geolocation area.

In an example embodiment, similar to step S103, in the case of a plurality of polygons (multiple polygons) parallel processing (i.e., processing in separate threads) as set forth in step S103 is applied. To this end, for each thread, the system commences a parallel step S105 to compare each network element with one of the multiple polygons (i.e., the boundaries of the polygon-defined geolocation area) in the respective thread.

As a result, the parallel processing as set forth above allows for a time-efficient implementation.

In step S106 based on the comparison, the system determines for each polygon, that the geolocation of at least one network element intersects with the polygon-defined geolocation area (YES in step S106).

Alternatively, in case the system determines for each polygon, that the geolocation of at least one network element does not intersect with the polygon-defined geolocation area (NO in step S106), the system may end the method for implementing geolocation-based polygon analysis to determine network elements for the polygon (i.e., for the particular polygon-defined geolocation area).

In step S107 (YES in step S106) based on the determination, for each polygon, the system outputs the at least one intersecting network element of the polygon.

To this end, the system may collect the identification data (e.g., name, Key performance indicators, etc.) of intersecting network elements determined in step S106 from a network element service (e.g., an inventory service of the telecommunications network).

Moreover, the processed polygon may be stored in a spatial database. To this end, the system may provide a GUI to allow a user to input polygon identification data to store the polygon along with its intersecting network elements determined in step S106.

As a result, by outputting at least one intersecting network element of the processed polygon in step S107 (e.g., storing the polygon along its intersecting network elements) the network elements can be outputted (e.g., listed, visualized, etc. on a GUI) for a specific (freely determined) geolocation area that is out of scope of the predetermined (fixed) geolocation areas based on non-existing (i.e., not stored) geolocation data of the geolocation service.

Figure 2:
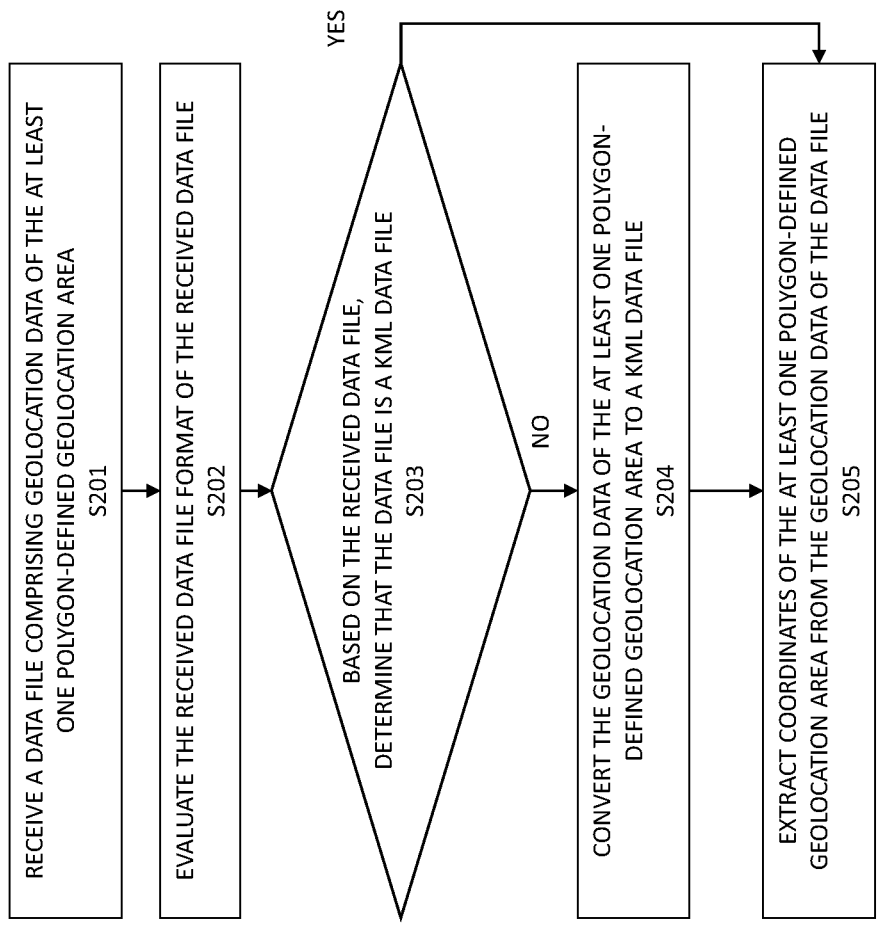
FIG. 2 illustrates receiving a data file comprising geolocation data for implementing geolocation-based polygon analysis to determine network elements in a polygon-defined geolocation area according to an embodiment.

FIG. 2 illustrates receiving a data file comprising geolocation data for implementing geolocation-based polygon analysis to determine network elements in a polygon-defined geolocation area according to an embodiment.

Referring to FIG. 2, in step S201, the system receives a data file comprising geolocation data of at least one polygon-defined geolocation area.

In an example embodiment, the data file may be a spatial data file such as a Keyhole Markup Language (KML) data file, wherein Keyhole Markup Language format is used to display geographic data (i.e., geolocation graphic user interface such as a geolocation browser).

In another example embodiment, the data file may be a spatial data file such as, for example a TAB file format (i.e., a geospatial vector data format developed for geographic information system (GIS) software), a SHAPE file (*.shp) format (i.e., another geospatial vector data format for geographic information system (GIS) software), etc.

In step S202, the system evaluates the data file format of the received data file comprising geolocation data of at least one polygon-defined geolocation area. For example, the system may evaluate whether the data file format is a KML file format, a TAB file format or a SHAP file format.

In step S203, the system determines that the data file comprising geolocation data of at least one polygon-defined geolocation area is not a Keyhole Markup Language (KML) data file (NO in step S203).

In step S204 (NO in step S203), the system converts the geolocation data of at least one polygon-defined geolocation area to a KML data file.

For example, the system may convert a data file in a TAB file format or a SHAP file format to a data file in the KML data file format.

In step S205, the system extracts coordinates of at least one polygon-defined geolocation area from the geolocation data of the KML data file. Thereafter, the system commences the method according to steps S103 to S107 as set forth in FIG. 1.

Figure 3:
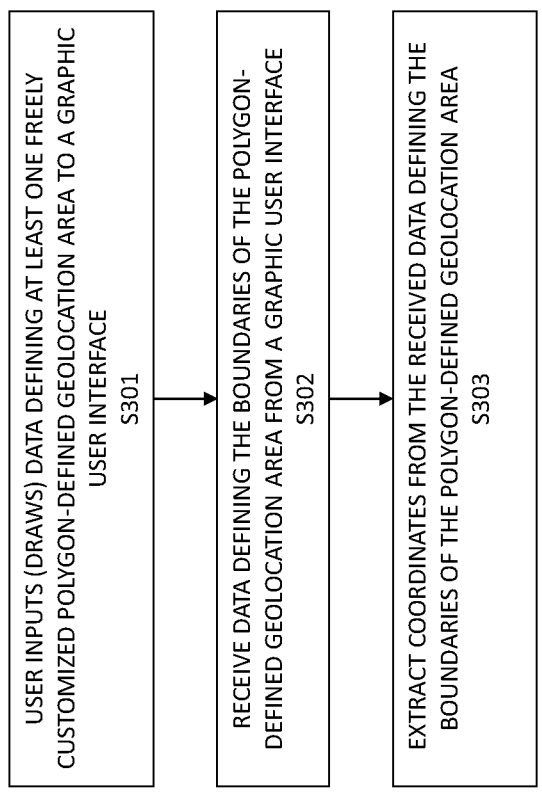
FIG. 3 illustrates receiving data defining the boundaries of at least one polygon-defined geolocation area from a graphic user interface for implementing geolocation-based polygon analysis to determine network elements in a polygon-defined geolocation area according to an embodiment.

FIG. 3 illustrates receiving data defining the boundaries of at least one polygon-defined geolocation area from a graphic user interface for implementing geolocation-based polygon analysis to determine network elements in a polygon-defined geolocation area according to an embodiment.

Referring to FIG. 3, in step S301, the user enters (geolocation) defining the boundaries of at least one freely defined geolocation area to a graphic user interface (e.g., the user selects at least three points defining coordinates such as latitude and longitude data on a map displayed by the graphic user interface (GUI)).

In step S302, the system receives the data defining the boundaries of at least one geolocation area according to the user input to the GUI.

In step S303, the system extracts coordinates (e.g., the latitude and longitude data) from the data defining the boundaries of at least one geolocation area.

In an example embodiment, the user may select at least three points defining coordinates (i.e., latitude and longitude data) on a map displayed by the graphic user interface and store the polygon defined by the at least three points selected by the user.

In order to identify the polygon, the user may input data identifying the polygon (i.e., polygon identification data) to a graphic user interface. The polygon identification data may comprise at least one of a name of a geographic area to which the polygon relates, a category of the polygon, a source of the polygon, a creation date, an author of the polygon, etc.

FIG. 4 illustrates outputting at least one intersecting network element of a polygon according to an embodiment. Referring to FIG. 4, in step S401, similar to step S107 in FIG. 1, for each polygon, the system outputs the least one intersecting network element of a processed polygon.

For example, when outputting at least one intersecting network element of a polygon, in step S401, the system may provide a graphic user interface that allows a user to input data identifying the polygon (i.e., polygon identification data) to a graphic user interface. The polygon identification data may comprise at least one of a name of a geographic area to which the polygon relates, a category of the polygon, a source of the polygon, a creation date, an author of the polygon, etc.

In step S402, the system receives, via a graphic user interface, for each polygon, at least one polygon identification data.

In step S403, based on the received at least one polygon identification data, the system stores the polygon comprising the coordinates of the polygon-defined geolocation area to a geography service database.

Referring to FIG. 4, user-defined geolocation areas may be added to the predetermined (fixed) geolocation areas that have not been stored in the geographic services database for later use.

For example, the user may select the geolocation data of the user-defined geolocation areas at one time and determine the network elements that intersect with the stored user-defined geolocation areas at a later time. This has the advantage of allowing the user to create a library of user-defined geolocation areas to perform geolocation-based polygon analysis to determine network elements within the user-defined polygon-defined geolocation areas stored in the geography services database.

FIG. 5 illustrates outputting at least one intersecting network element of a polygon according to another embodiment. Referring to FIG. 5, in step S501, similar to step S107 in FIG. 1, for each polygon, the system outputs at least one intersecting network element of a processed polygon.

For example, when outputting at least one intersecting network element of a polygon, in step S501, the system may provide a graphic user interface that allows a user to input data identifying the polygon (i.e., polygon identification data) similar to step S401 in FIG. 4.

In step S502, the system receives, via a graphic user interface (GUI), for each polygon, at least one polygon identification data.

In step S503, based on the received at least one polygon identification data, the system stores at least one intersecting network element of the polygon as well as the geolocation data of the polygon (i.e., the coordinates defining the boundaries of the polygon) to a spatial database.

In an alternative step, before or after steps S502 or S503, the system may display (e.g., output, list, etc.) the intersecting network element of the polygon in a GUI to provide the user with an overview of all networks elements in the user-defined geolocation area defined by the selected polygon.

Referring to FIG. 5, in an example embodiment, the system, in response to a user selecting a stored polygon from a spatial database, may display (e.g., output, list, etc.) the intersecting network element of the polygon in a GUI to provide the user an overview of all networks elements in the user-defined geolocation area defined by the selected polygon.

This has the advantage of allowing the user efficiently to obtain the intersecting network element of the polygon defining a user-defined geolocation area without tedious and time-consuming human interaction and without human errors in determining and listing network elements within the specific polygon-defined geolocation.

Figure 6:
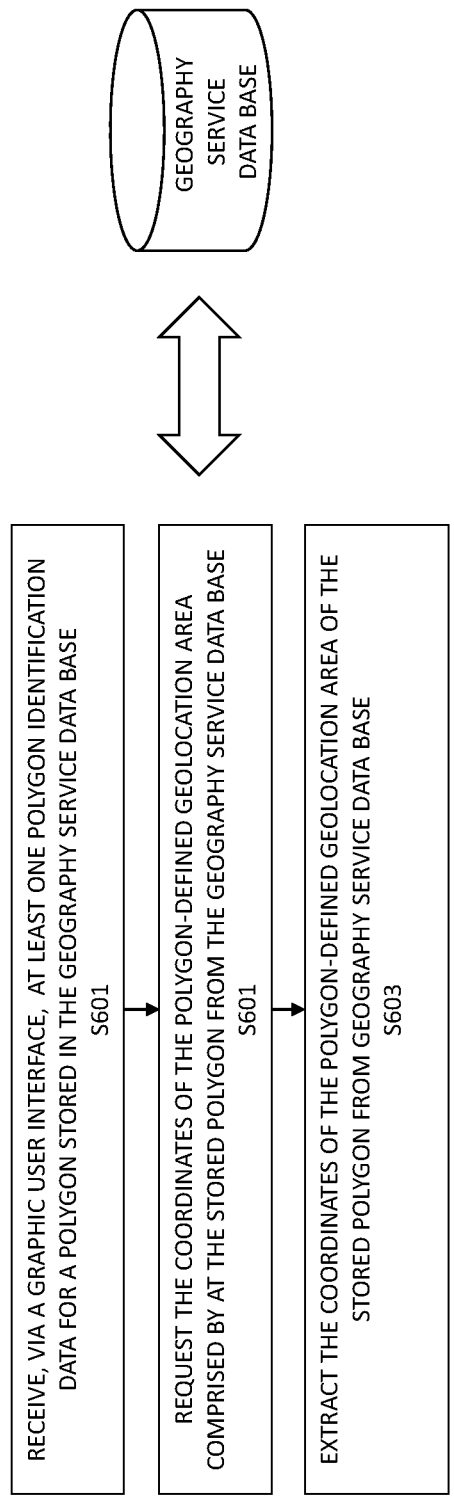
FIG. 6 illustrates receiving, via a graphic user interface, at least one polygon identification data for a polygon stored in a geography service database according to another embodiment.

FIG. 6 illustrates receiving, via a graphic user interface, at least one polygon identification data for a polygon stored in a geography service database according to another embodiment.

Referring to FIG. 6, in step S601, the system receives, via a graphic user interface (GUI), at least one polygon identification data for a polygon stored in the geography service database.

In step S602, the system requests the coordinates of the polygon-defined geolocation area comprised of the stored polygon from the geography service database (e.g., the coordinates of the polygon-defined geolocation area comprised by the stored polygon in accordance with FIG. 4).

In step S603, the system extracts the coordinates of the polygon-defined geolocation area of the stored polygon from the geography service database. Thereafter the system may perform steps S103 to S107 of FIG. 1.

Figure 7:
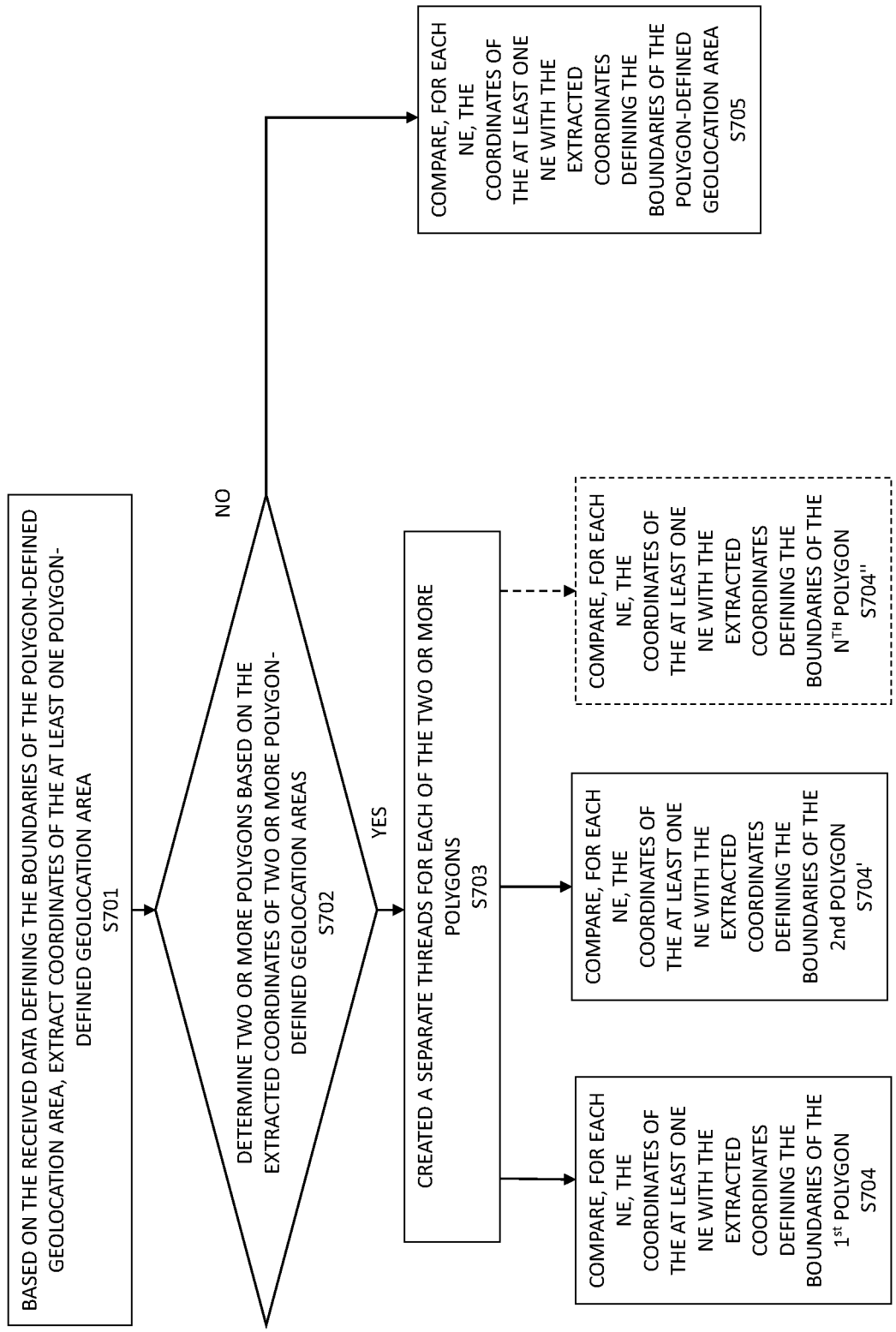
FIG. 7 illustrates the creation of threads for parallel implementation geolocation-based polygon analysis to determine network elements in multiple polygons according to an embodiment.

FIG. 7 illustrates creating threads for parallel implementing geolocation-based polygon analysis to determine network elements in multiple polygons according to an embodiment.

Referring to FIG. 7, in step S701, the system, based on the received data defining the boundaries of the polygon-defined geolocation area, extracts coordinates of at least one polygon-defined geolocation area.

In step S702, the system determines two or more polygons based on the extracted coordinates of two or more polygon-defined geolocation areas (YES in step S702). Alternatively, in step S702, the system determines a single polygon based on the extracted coordinates of one polygon-defined geolocation area (NO in step S702). In this case, the system does not create threads for parallel processing and continues as set forth in steps S104 to S107 in FIG. 1.

In step S703 (YES in step S702) the system creates separate threads for each of the two or more polygons for enabling parallel processing to the method for implementing geolocation-based polygon analysis to determine network elements in each of the multiple polygons (i.e., each polygon-defined geolocation area) according to their respective thread.

In parallel steps S704, S704', S704" (e.g., for a first polygon, a second polygon, a nth polygon, etc.), the system for each thread, compares, for each network element, the coordinates of at least one network element with the extracted coordinates defining the boundaries of the polygon-defined geolocation area in the respective thread.

Furthermore, in each thread, the system processes the geolocation-based polygon analysis similar to steps S104 to S107 in FIG. 1 for each polygon (e.g., the first polygon, second polygon, nth polygon, etc.) in parallel. This has the advantage that the creation of separate threads allows for fast processing of the method for implementing geolocation-based polygon analysis to determine network elements in multiple polygon-defined geolocation areas.

In step S705 (NO in step S702), only a single polygon has been determined and the system continues to process the geolocation-based polygon analysis similar to steps S104 to S107 in FIG. 1.

Figure 8:
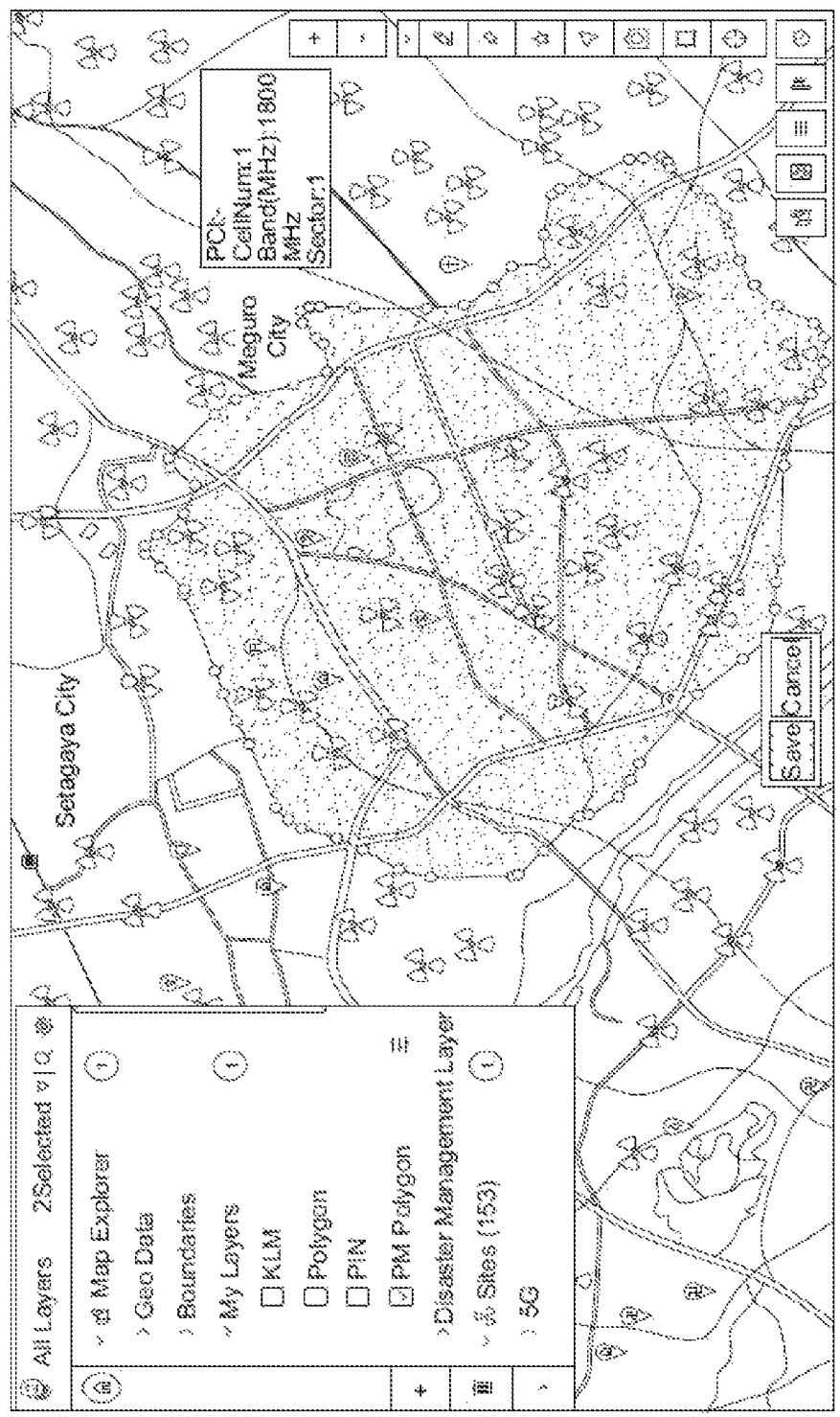
FIG. 8 illustrates a graphic user interface to input data defining the boundaries of the polygon-defined geolocation area according to an embodiment.

FIG. 8 illustrates a graphic user interface (GUI) to input data defining the boundaries of the polygon-defined geolocation area according to an embodiment.

Referring to FIG. 8, the GUI provides the user with a map showing all available network elements (i.e. cell sites) according to the inventory data of a telecommunications network. According to the menu of the GUI, the user can either manually select the geo data of the network element of interest on the map or select boundaries of geolocations (geolocation areas) of interest.

Regarding the menu item to select boundaries of geolocations (geolocation areas) of interest the user may choose different layers depending on the category of the geolocations (geolocation areas) of interest.

For example, one layer may comprise geolocations (geolocation areas) of interest to be retrieved or to be stored in a KML data file, another layer may comprise already processed polygons (geolocation areas of polygonal shape along with their intersecting network elements), yet another layer comprises Pins marking the boundaries of the boundaries of geolocations (geolocation areas) of interest on the map, and yet another layer comprises the polygon (i.e., PM polygons) as highlighted in FIG. 8 for which the network elements should be determined and outputted.

In an example embodiment, the menu according to the GUI of FIG. 8 may also comprise a disaster management layer for limiting the displaying (processing) to fail-safe inventory (network elements) of the telecommunications network.

In another example embodiment, the menu may be limited for displaying (processing) network elements that relates to either a 4G mobile communication standard RAN or a 5G mobile communication standard RAN.

Referring to FIG. 8, the user can freely select a geolocation area by pinning its boundaries on the map. The selected geolocation area on the GUI is defined by a polygonal shape that may refer to any area that is defined by coordinates (e.g., longitude and latitude data of the pins) spanning a plane with a polygonal shape on the map. After selecting the geolocation area as set forth above, the user may save the polygon (e.g., in a library of customized polygons) or cancel the polygon according to the GUI.

Figure 9:
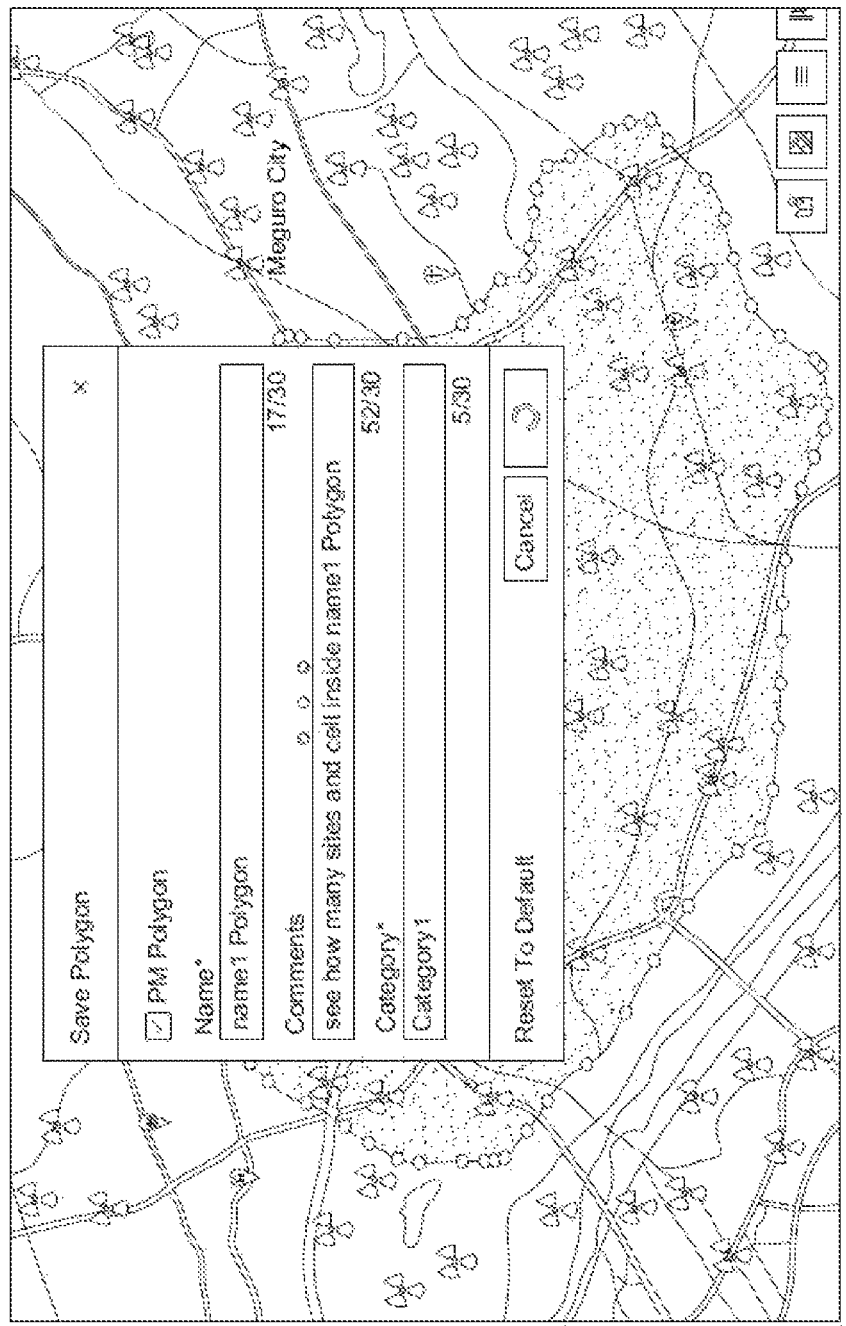
FIG. 9 illustrates a graphic user interface to input at least one polygon identification data for storing the polygon-related coordinates of the polygon-defined geolocation area and the at least one intersecting network element of the polygon to a spatial database according to an embodiment.

FIG. 9 illustrates a graphic user interface to input at least one polygon identification data for storing the polygon-related coordinates of the polygon-defined geolocation area and the at least one intersecting network element of the polygon to a spatial database according to an embodiment.

Referring to FIG. 9, in case the user determined to save the polygon (e.g., in a library of customized polygons) of spatial database or a geography service database.

To this end, in FIG. 9 the system provides a GUI that allows the user to input data identifying the polygon (i.e., polygon identification data), such as the name of a geographic area to which the polygon relates, comments to the particular area, a category of the polygon (i.e., a single polygon or a plurality of polygons, such as a user-defined polygon drawn by a user on the graphical user interface (GUI) or a plurality of predetermined polygons of a data file), etc. In an example embodiment, a user and/or the system may add a source (i.e., a single GUI polygon or multiple data file polygons), a creation date, an author of the polygon, etc. to the data identifying the polygon (i.e., polygon identification data).

Figure 10:
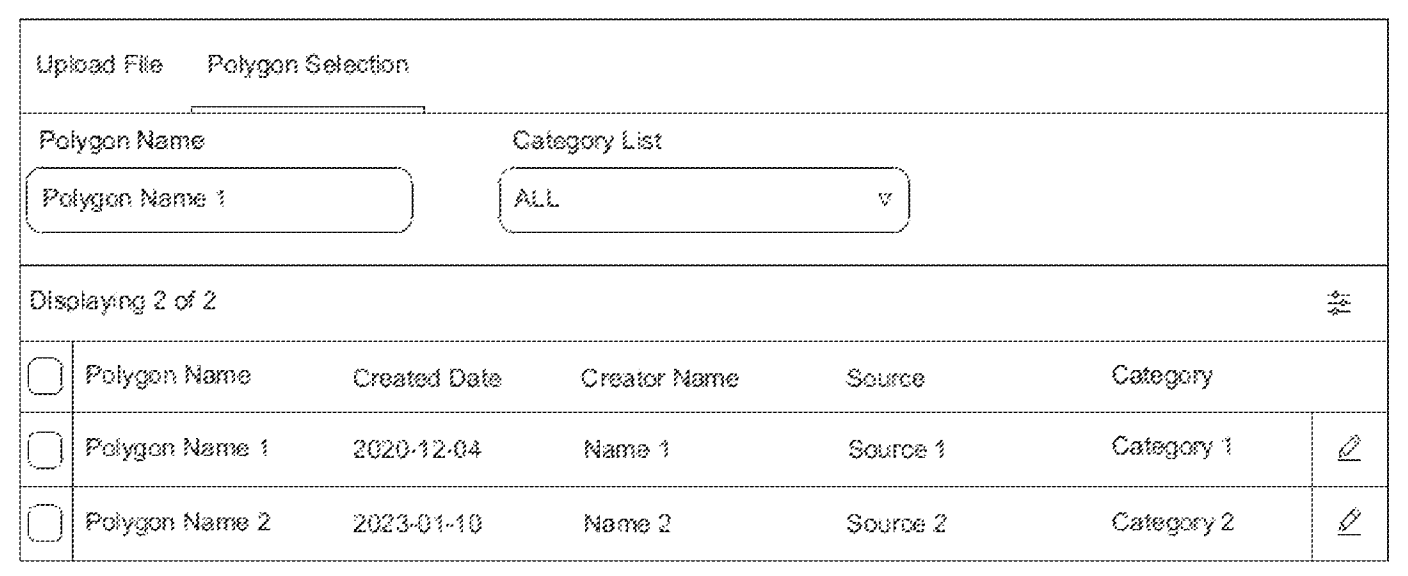

FIG. 10 illustrates a graphic user interface to select a polygon stored in a spatial database from at least one polygon identification data according to an embodiment.

Referring to FIG. 10, the system provides a graphic user interface (GUI) to select a polygon (i.e., a geolocation area in a polygonal shape) a stored in a spatial database from at least one polygon identification data. In an example embodiment, the GUI displays of list of polygons, wherein each of the listed polygons can be selected by data identifying the polygon (i.e., polygon identification data), such as the name of a geographic area to which the polygon relates, a category of the polygon (i.e., a single polygon or a plurality of polygons, such as a user-defined polygon drawn by a user on the graphical user interface (GUI) or a plurality of predetermined polygons of a data file), a source (i.e., a single GUI polygon or multiple data file polygons), a creation date, an author of the polygon, etc.

In another example embodiment, the GUI may provide at least one input field (e.g., a polygon name, a category list, etc.) that allows a user to select a polygon that is stored in a spatial database.

Furthermore, the polygon may be selected from an uploaded file, such as a Keyhole Markup Language (KML) data file, wherein Keyhole Markup Language format is used to display geographic data (i.e., geolocation graphic user interface such as a geolocation browser).

Moreover, the polygon may be selected from an uploaded file, such as a TAB file format (i.e., a geospatial vector data format developed for geographic information system (GIS) software), a SHAPE file (*.shp) format (i.e., another geospatial vector data format for geographic information system (GIS) software), etc.

In yet another example embodiment, the polygon may be selected from an uploaded file or from a polygon comprising data defining the boundaries of the polygon-defined geolocation area of a stored polygon of a geographic service database.

Figure 11:
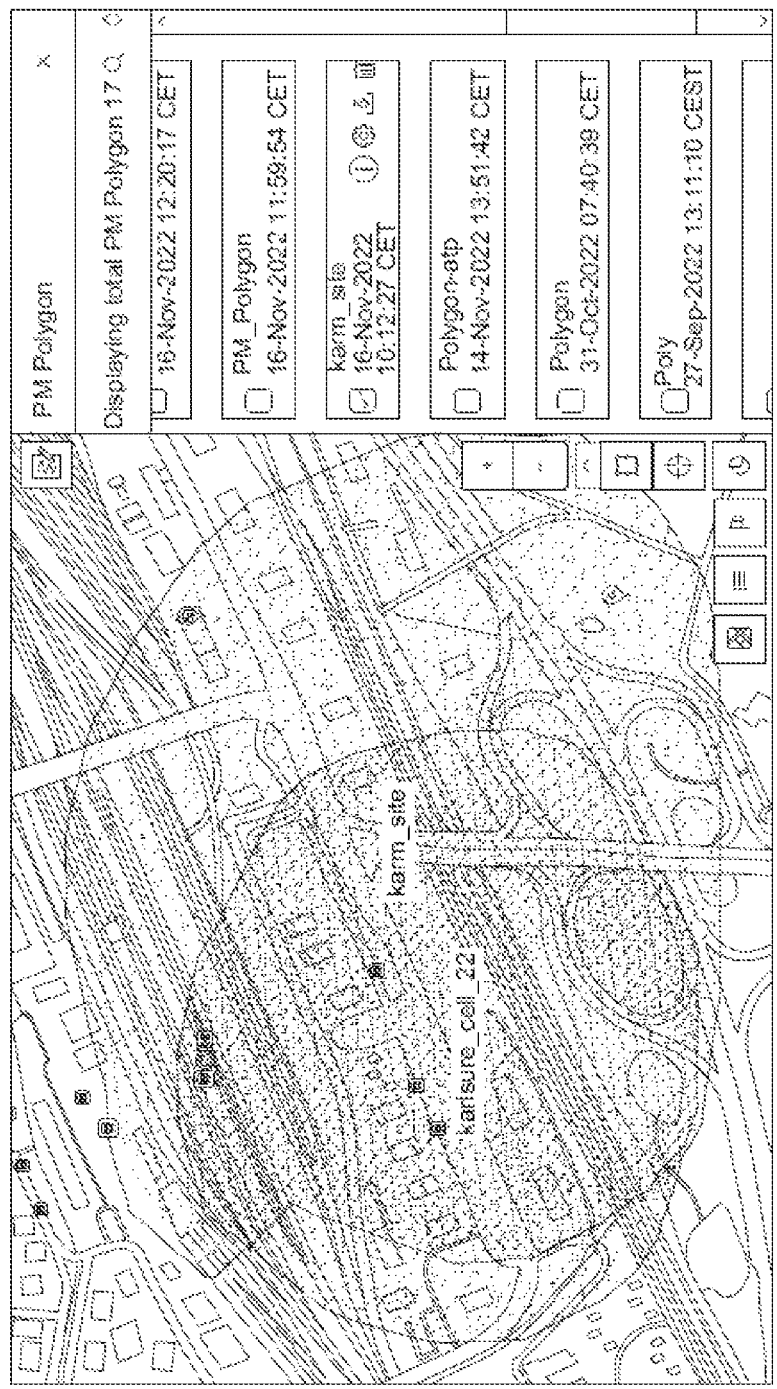
FIG. 11 illustrates a graphic user interface to display at least one stored polygon a spatial database according to an embodiment.

FIG. 11 illustrates a graphic user interface to display at least one stored polygon in a spatial database according to an embodiment.

Referring to FIG. 11, the GUI provides a list of polygons (e.g., a list of polygons referring to one category such as customized polygons PM polygons) that allows a user to select multiple polygons to be displayed in the GUI in multiple layers that may overlap on a map.

Figure 12:
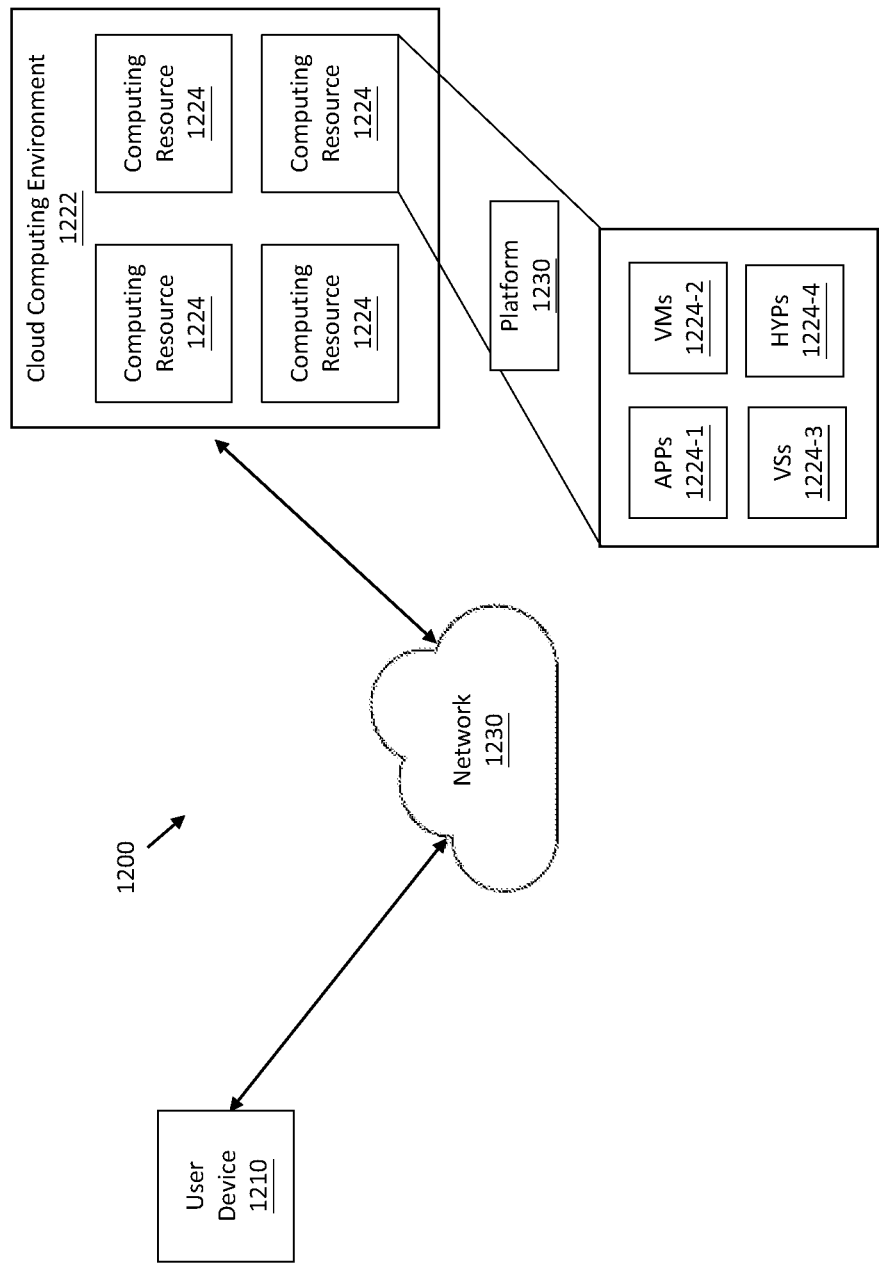
FIG. 12 is a diagram of an example environment in which systems and/or methods, described herein, may be implemented.

FIG. 12 is a diagram of an example environment 1200 in which systems and/or methods, described herein, may be implemented. As shown in FIG. 12, environment 1200 may include a user device 1210, a platform 1220, and a network 1230. Devices of environment 1200 may interconnect via wired connections, wireless connections, or a combination of wired and wireless connections. In embodiments, any of the functions and operations described with reference to FIG. 1 above may be performed by any combination of elements illustrated in FIG. 12.

User device 1210 includes one or more devices capable of receiving, generating, storing, processing, and/or providing information associated with platform 1220. For example, user device 1210 may include a computing device (e.g., a desktop computer, a laptop computer, a tablet computer, a handheld computer, a smart speaker, a server, etc.), a mobile phone (e.g., a smartphone, a radiotelephone, etc.), a wearable device (e.g., a pair of smart glasses or a smart watch), or a similar device. In some implementations, user device 1210 may receive information from and/or transmit information to platform 1220.

Platform 1220 includes one or more devices capable of receiving, generating, storing, processing, and/or providing information. In some implementations, platform 1220 may include a cloud server or a group of cloud servers. In some implementations, platform 1220 may be designed to be modular such that certain software components may be swapped in or out depending on a particular need. As such, platform 1220 may be easily and/or quickly reconfigured for different uses.

In some implementations, as shown, platform 1220 may be hosted in cloud computing environment 1222. Notably, while implementations described herein describe platform 1220 as being hosted in cloud computing environment 1222, in some implementations, platform 1220 may not be cloud-based (i.e., may be implemented outside of a cloud computing environment) or may be partially cloud-based.

Cloud computing environment 1222 includes an environment that hosts platform 1220. Cloud computing environment 1222 may provide computation, software, data access, storage, etc., services that do not require end-user (e.g., user device 1210) knowledge of a physical location and configuration of system(s) and/or device(s) that hosts platform 1220. As shown, cloud computing environment 1222 may include a group of computing resources 1224 (referred to collectively as "computing resources 1224" and individually as "computing resource 1224").

Computing resource 1224 includes one or more personal computers, a cluster of computing devices, workstation computers, server devices, or other types of computation and/or communication devices. In some implementations, computing resource 1224 may host platform 1220. The cloud resources may include compute instances executing in computing resource 1224, storage devices provided in computing resource 1224, data transfer devices provided by computing resource 1224, etc. In some implementations, computing resource 1224 may communicate with other computing resources 1224 via wired connections, wireless connections, or a combination of wired and wireless connections.

As further shown in FIG. 12, computing resource 1224 includes a group of cloud resources, such as one or more applications ("APPs") 1224-1, one or more virtual machines ("VMs") 1224-2, virtualized storage ("VSs") 1224-3, one or more hypervisors ("HYPs") 1224-4, or the like.

Application 1224-1 includes one or more software applications that may be provided to or accessed by user device 1210. Application 1224-1 may eliminate a need to install and execute the software applications on user device 1210. For example, application 1224-1 may include software associated with platform 1220 and/or any other software capable of being provided via cloud computing environment 1222. In some implementations, one application 1224-1 may send/receive information to/from one or more other applications 1224-1, via virtual machine 1224-2.

Virtual machine 1224-2 includes a software implementation of a machine (e.g., a computer) that executes programs like a physical machine. Virtual machine 1224-2 may be either a system virtual machine or a process virtual machine, depending upon use and degree of correspondence to any real machine by virtual machine 1224-2. A system virtual machine may provide a complete system platform that supports execution of a complete operating system ("OS"). A process virtual machine may execute a single program, and may support a single process. In some implementations, virtual machine 1224-2 may execute on behalf of a user (e.g., user device 1210), and may manage infrastructure of cloud computing environment 1222, such as data management, synchronization, or long-duration data transfers.

Virtualized storage 1224-3 includes one or more storage systems and/or one or more devices that use virtualization techniques within the storage systems or devices of computing resource 1224. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 1224-4 may provide hardware virtualization techniques that allow multiple operating systems (e.g., "guest operating systems") to execute concurrently on a host computer, such as computing resource 1224. Hypervisor 1224-4 may present a virtual operating platform to the guest operating systems, and may manage the execution of the guest operating systems. Multiple instances of a variety of operating systems may share virtualized hardware resources.

Network 1230 includes one or more wired and/or wireless networks. For example, network 1230 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 12 are provided as an example. In practice, there may be additional devices and/or networks, fewer devices and/or networks, different devices and/or networks, or differently arranged devices and/or networks than those shown in FIG. 12. Furthermore, two or more devices shown in FIG. 12 may be implemented within a single device, or a single device shown in FIG. 12 may be implemented as multiple, distributed devices. Additionally, or alternatively, a set of devices (e.g., one or more devices) of environment 1200 may perform one or more functions described as being performed by another set of devices of environment 1200.

Figure 13:
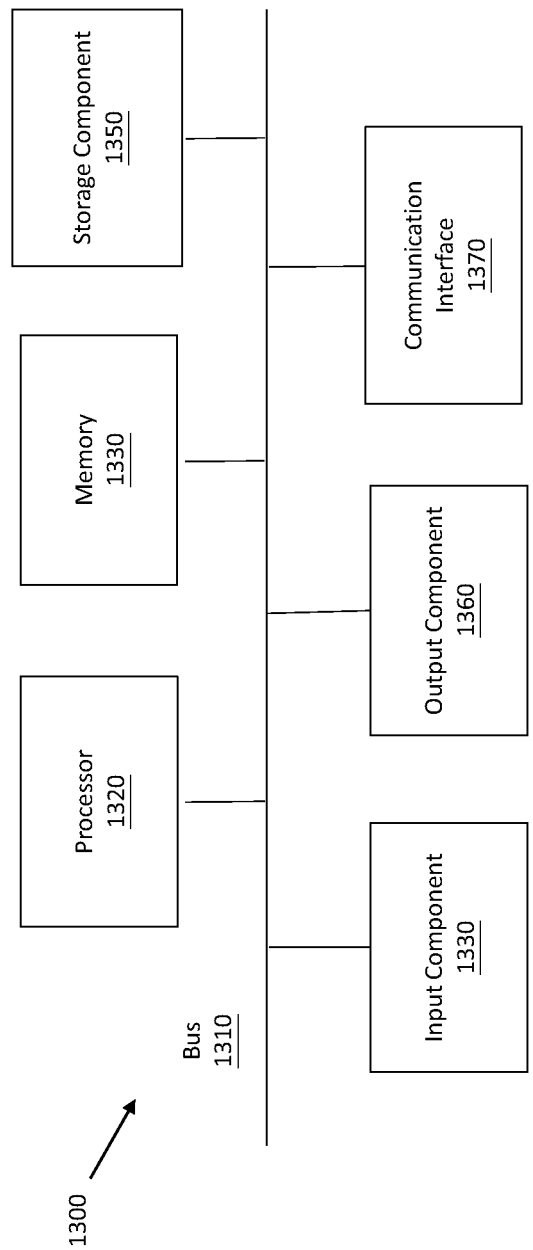
FIG. 13 is a diagram of example components of a device according to an embodiment.

FIG. 13 is a diagram of example components of a device 1300. Device 1300 may correspond to user device 1210 and/or platform 1220. As shown in FIG. 13, device 1300 may include a bus 1310, a processor 1320, a memory 1330, a storage component 1340, an input component 1350, an output component 1360, and a communication interface 1370.

Bus 1310 includes a component that permits communication among the components of device 1300. Processor 1320 may be implemented in hardware, firmware, or a combination of hardware and software. Processor 1320 may be a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 1320 includes one or more processors capable of being programmed to perform a function. Memory 1330 includes a random access memory (RAM), a read only memory (ROM), and/or another type of dynamic or static storage device (e.g., a flash memory, a magnetic memory, and/or an optical memory) that stores information and/or instructions for use by processor 1320.

Storage component 1340 stores information and/or software related to the operation and use of device 1300. For example, storage component 1340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive. Input component 1350 includes a component that permits device 1300 to receive information, such as via user input (e.g., a touch screen display, a keyboard, a keypad, a mouse, a button, a switch, and/or a microphone). Additionally, or alternatively, input component 1350 may include a sensor for sensing information (e.g., a global positioning system (GPS) component, an accelerometer, a gyroscope, and/or an actuator). Output component 1360 includes a component that provides output information from device 1300 (e.g., a display, a speaker, and/or one or more light-emitting diodes (LEDs)).

Communication interface 1370 includes a transceiver-like component (e.g., a transceiver and/or a separate receiver and transmitter) that enables device 1300 to communicate with other devices, such as via a wired connection, a wireless connection, or a combination of wired and wireless connections. Communication interface 1370 may permit device 1300 to receive information from another device and/or provide information to another device. For example, communication interface 1370 may include an Ethernet interface, an optical interface, a coaxial interface, an infrared interface, a radio frequency (RF) interface, a universal serial bus (USB) interface, a Wi-Fi interface, a cellular network interface, or the like.

Device 1300 may perform one or more processes described herein. Device 1300 may perform these processes in response to processor 1320 executing software instructions stored by a non-transitory computer-readable medium, such as memory 1330 and/or storage component 1340. A computer-readable medium is defined herein as a non-transitory memory device. A memory device includes memory space within a single physical storage device or memory space spread across multiple physical storage devices.

Software instructions may be read into memory 1330 and/or storage component 1340 from another computer-readable medium or from another device via communication interface 1370. When executed, software instructions stored in memory 1330 and/or storage component 1340 may cause processor 1320 to perform one or more processes described herein.

Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 13 are provided as an example. In practice, device 1300 may include additional components, fewer components, different components, or differently arranged components than those shown in FIG. 13. Additionally, or alternatively, a set of components (e.g., one or more components) of device 1300 may perform one or more functions described as being performed by another set of components of device 1300.

In embodiments, any one of the operations or processes of FIGS. 1 to 11 may be implemented by or using any one of the elements illustrated in FIGS. 12 and 13. It is understood that other embodiments are not limited thereto, and may be implemented in a variety of different architectures (e.g., bare metal architecture, any cloud-based architecture or deployment architecture such as Kubernetes, Docker, OpenStack, etc.).

According to embodiments, a system for implementing geolocation-based polygon analysis to determine network elements of a telecommunications network in a polygon-defined geolocation area, the system includes: a memory storing instructions; and at least one processor configured to execute the instructions to: based on at least one geolocation area defined by polygonal shape, receive data defining the boundaries of the polygon-defined geolocation area; based on the received data defining the boundaries of the polygon-defined geolocation area, extract coordinates of the at least one polygon-defined geolocation area; based on the extracted coordinates of the at least one polygon-defined geolocation area, determine at least one a polygon; based on geolocation data of network elements stored in a network element service database, receive coordinates defining the geolocation of at least one network element; for each network element and for each polygon, compare the coordinates of the at least one network element with the extracted coordinates defining the boundaries of the polygon-defined geolocation area; based on the comparison, determine for each polygon, that the geolocation of the at least one network element intersects with the polygon-defined geolocation area; based on the determination, for each polygon, output the at least one intersecting network element of the polygon.

While receiving the data defining the boundaries of the polygon-defined geolocation area, the at least one processor may be further configured to execute the instructions to: receive a data file may include geolocation data of the at least one polygon-defined geolocation area; extract coordinates of the at least one polygon-defined geolocation area from the geolocation data of the data file.

While receiving the data file may include geolocation data of the at least one polygon-defined geolocation area, the at least one processor may be further configured to execute the instructions to: evaluate the data file format of the received the data file may include geolocation data of the at least one polygon-defined geolocation area; determine that the data file may include geolocation data of the at least one polygon-defined geolocation area is not a Keyhole Markup Language (KML) data file; convert the geolocation data of the at least one polygon-defined geolocation area to a KML data file; extract coordinates of the at least one polygon-defined geolocation area from the geolocation data of the KML data file.

While receiving the data defining the boundaries of the polygon-defined geolocation area, the at least one processor may be further configured to execute the instructions to: receive data defining the boundaries of the polygon-defined geolocation area from a graphic user interface; extract coordinates from the received data defining the boundaries of the polygon-defined geolocation area.

While outputting the at least one intersecting network element of the polygon, for each polygon, the at least one processor may be further configured to execute the instructions to: receive, via a graphic user interface, for each polygon, at least one polygon identification data; based on the received at least one polygon identification data, store the polygon may include the coordinates of the polygon-defined geolocation area to a geography service database.

While receiving data defining the boundaries of the polygon-defined geolocation area, the at least one processor may be further configured to execute the instructions to: receive, via a graphic user interface, the at least one polygon identification data for a polygon stored in the geography service database; request the coordinates of the polygon-defined geolocation area comprised by the stored polygon from the geography service database; extract the coordinates of the polygon-defined geolocation area of the stored polygon from geography service database.

While outputting the at least one intersecting network element of the polygon, for each polygon, the at least one processor may be further configured to execute the instructions to: receive, for each polygon, at least one polygon identification data; based on the received at least one polygon identification data, store the polygon may include the coordinates of the polygon-defined geolocation area and the at least one intersecting network element of the polygon to a spatial database.

While extracting the coordinates defining the boundaries of the polygon-defined geolocation area, the at least one processor may be further configured to execute the instructions to: determine two or more polygons based on the extracted coordinates of two or more polygon-defined geolocation areas; create a separate thread for each of the two or more polygons; for each separate thread, compare, for each network element, the coordinates of the at least one network element with the extracted coordinates defining the boundaries of the polygon-defined geolocation area in the thread.

According to embodiments, a method for implementing geolocation-based polygon analysis to determine network elements of a telecommunications network in a polygon-defined geolocation area, the method includes: based on at least one geolocation area defined by polygonal shape, receiving data defining the boundaries of the polygon-defined geolocation area; based on the received data defining the boundaries of the polygon-defined geolocation area, extracting coordinates of the at least one polygon-defined geolocation area; based on the extracted coordinates of the at least one polygon-defined geolocation area, determining at least one a polygon; based on geolocation data of network elements stored in a network element service database, receiving coordinates defining the geolocation of at least one network element; for each network element and for each polygon, comparing the coordinates of the at least one network element with the extracted coordinates defining the boundaries of the polygon-defined geolocation area; based on the comparison, determining for each polygon, that the geolocation of the at least one network element intersects with the polygon-defined geolocation area; based on the determination, for each polygon, outputting the at least one intersecting network element of the polygon.

While receiving the data defining the boundaries of the polygon-defined geolocation area, the method may further include: receiving a data file may include geolocation data of the at least one polygon-defined geolocation area; extracting coordinates of the at least one polygon-defined geolocation area from the geolocation data of the data file.

While receiving the data file may include geolocation data of the at least one polygon-defined geolocation area, the method may further include: evaluating the data file format of the received the data file may include geolocation data of the at least one polygon-defined geolocation area; determining that the data file may include geolocation data of the at least one polygon-defined geolocation area is not a Keyhole Markup Language (KML) data file; converting the geolocation data of the at least one polygon-defined geolocation area to a KML data file; extracting coordinates of the at least one polygon-defined geolocation area from the geolocation data of the KML data file.

While receiving the data defining the boundaries of the polygon-defined geolocation area, the method may further include: receiving data defining the boundaries of the polygon-defined geolocation area from a graphic user interface; extracting coordinates from the received data defining the boundaries of the polygon-defined geolocation area.

While outputting the at least one intersecting network element of the polygon, for each polygon, the method may further include: receiving, for each polygon, at least one polygon identification data; based on the received at least one polygon identification data, storing the polygon may include the coordinates of the polygon-defined geolocation area and the at least one intersecting network element of the polygon to a spatial database.

While extracting the coordinates defining the boundaries of the polygon-defined geolocation area, the at least one processor may be further configured to execute the instructions to: determining two or more polygons based on the extracted coordinates of two or more polygon-defined geolocation areas; creating a separate thread for each of the two or more polygons; for each separate thread, comparing, for each network element, the coordinates of the at least one network element with the extracted coordinates defining the boundaries of the polygon-defined geolocation area in the thread.

According to embodiments, a non-transitory computer-readable recording medium having recorded thereon instructions executable by at least one processor configured to perform a method for implementing geolocation-based polygon analysis to determine network elements of a telecommunications network in a polygon-defined geolocation area, the method includes: based on at least one geolocation area defined by polygonal shape, receiving data defining the boundaries of the polygon-defined geolocation area; based on the received data defining the boundaries of the polygon-defined geolocation area, extracting coordinates of the at least one polygon-defined geolocation area; based on the extracted coordinates of the at least one polygon-defined geolocation area, determining at least one a polygon; based on geolocation data of network elements stored in a network element service database, receiving coordinates defining the geolocation of at least one network element; for each network element and for each polygon, comparing the coordinates of the at least one network element with the extracted coordinates defining the boundaries of the polygon-defined geolocation area; based on the comparison, determining for each polygon, that the geolocation of the at least one network element intersects with the polygon-defined geolocation area; based on the determination, for each polygon, outputting the at least one intersecting network element of the polygon.

While receiving the data defining the boundaries of the polygon-defined geolocation area, the method may further include: receiving a data file may include geolocation data of the at least one polygon-defined geolocation area; extracting coordinates of the at least one polygon-defined geolocation area from the geolocation data of the data file.

While receiving the data file may include geolocation data of the at least one polygon-defined geolocation area, the method may further include: evaluating the data file format of the received the data file may include geolocation data of the at least one polygon-defined geolocation area; determining that the data file may include geolocation data of the at least one polygon-defined geolocation area is not a Keyhole Markup Language (KML) data file; converting the geolocation data of the at least one polygon-defined geolocation area to a KML data file; extracting coordinates of the at least one polygon-defined geolocation area from the geolocation data of the KML data file.

While receiving the data defining the boundaries of the polygon-defined geolocation area, the method may further include: receiving data defining the boundaries of the polygon-defined geolocation area from a graphic user interface; extracting coordinates from the received data defining the boundaries of the polygon-defined geolocation area.

While outputting the at least one intersecting network element of the polygon, for each polygon, the method may further include: receiving, for each polygon, at least one polygon identification data; based on the received at least one polygon identification data, storing the polygon may include the coordinates of the polygon-defined geolocation area and the at least one intersecting network element of the polygon to a spatial database.

While extracting the coordinates defining the boundaries of the polygon-defined geolocation area, the method may further comprise: determining two or more polygons based on the extracted coordinates of two or more polygon-defined geolocation areas; creating a separate thread for each of the two or more polygons; for each separate thread, comparing, for each network element, the coordinates of the at least one network element with the extracted coordinates defining the boundaries of the polygon-defined geolocation area in the thread.

According to embodiments, systems and methods are provided for implementing geolocation-based polygon analysis to automatically determine and output network elements of a telecommunications network located in a customizable (i.e., freely determined) polygon-defined geolocation area. As a result, the systems and methods have the advantage that human interaction can be automated to increase the efficiency of RAN management, and that human errors can be eliminated, respectively.

The foregoing disclosure provides illustration and description, but is not intended to be exhaustive or to limit the implementations to the precise form disclosed. Modifications and variations are possible in light of the above disclosure or may be acquired from practice of the implementations.

Some embodiments may relate to a system, a method, and/or a computer readable medium at any possible technical detail level of integration. Further, one or more of the above components described above may be implemented as instructions stored on a computer readable medium and executable by at least one processor (and/or may include at least one processor). The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a microservice(s), module, segment, or portion of instructions, which comprises one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

What is claimed is:

1. A system for implementing geolocation-based polygon analysis to determine network elements of a telecommunications network in a polygon-defined geolocation area, the system comprising:
    a memory storing instructions; and
    at least one processor configured to execute the instructions to:
        based on at least one geolocation area defined by polygonal shape, receive data defining the boundaries of the polygon-defined geolocation area;
        based on the received data defining the boundaries of the polygon-defined geolocation area, extract coordinates of the at least one polygon-defined geolocation area;
        based on the extracted coordinates of the at least one polygon-defined geolocation area, determine at least one a polygon;
        based on geolocation data of network elements stored in a network element service database, receive coordinates defining the geolocation of at least one network element;
        for each network element and for each polygon, compare the coordinates of the at least one network element with the extracted coordinates defining the boundaries of the polygon-defined geolocation area;
        based on the comparison, determine for each polygon, that the geolocation of the at least one network element intersects with the polygon-defined geolocation area;
        based on the determination, for each polygon, output the at least one intersecting network element of the polygon.

2. The system as claimed in claim 1, wherein while receiving the data defining the boundaries of the polygon-defined geolocation area, the at least one processor is further configured to execute the instructions to:
    receive a data file comprising geolocation data of the at least one polygon-defined geolocation area;
    extract coordinates of the at least one polygon-defined geolocation area from the geolocation data of the data file.

3. The system as claimed in claim 2, wherein while receiving the data file comprising geolocation data of the at least one polygon-defined geolocation area, the at least one processor is further configured to execute the instructions to:
    evaluate the data file format of the received the data file comprising geolocation data of the at least one polygon-defined geolocation area;
    determine that the data file comprising geolocation data of the at least one polygon-defined geolocation area is not a Keyhole Markup Language (KML) data file;
    convert the geolocation data of the at least one polygon-defined geolocation area to a KML data file;
    extract coordinates of the at least one polygon-defined geolocation area from the geolocation data of the KML data file.

4. The system as claimed in claim 1, wherein while receiving the data defining the boundaries of the polygon-defined geolocation area, the at least one processor is further configured to execute the instructions to:
    receive data defining the boundaries of the polygon-defined geolocation area from a graphic user interface;
    extract coordinates from the received data defining the boundaries of the polygon-defined geolocation area.

5. The system as claimed in claim 1, wherein while outputting the at least one intersecting network element of the polygon, for each polygon, the at least one processor is further configured to execute the instructions to:
    receive, via a graphic user interface, for each polygon, at least one polygon identification data;
    based on the received at least one polygon identification data, store the polygon comprising the coordinates of the polygon-defined geolocation area to a geography service database.

6. The system as claimed in claim 5, wherein while receiving data defining the boundaries of the polygon-defined geolocation area, the at least one processor is further configured to execute the instructions to:
    receive, via a graphic user interface, the at least one polygon identification data for a polygon stored in the geography service database;
    request the coordinates of the polygon-defined geolocation area comprised by the stored polygon from the geography service database;
    extract the coordinates of the polygon-defined geolocation area of the stored polygon from geography service database.

7. The system as claimed in claim 1, wherein while outputting the at least one intersecting network element of the polygon, for each polygon, the at least one processor is further configured to execute the instructions to:
    receive, for each polygon, at least one polygon identification data;
    based on the received at least one polygon identification data, store the polygon comprising the coordinates of the polygon-defined geolocation area and the at least one intersecting network element of the polygon to a spatial database.

8. The system as claimed in claim 1, wherein while extracting the coordinates defining the boundaries of the polygon-defined geolocation area, the at least one processor is further configured to execute the instructions to:
    determine two or more polygons based on the extracted coordinates of two or more polygon-defined geolocation areas;
    create a separate thread for each of the two or more polygons;
    for each separate thread, compare, for each network element, the coordinates of the at least one network element with the extracted coordinates defining the boundaries of the polygon-defined geolocation area in the thread.

9. A method for implementing geolocation-based polygon analysis to determine network elements of a telecommunications network in a polygon-defined geolocation area, the method comprising:

based on at least one geolocation area defined by polygonal shape, receiving data defining the boundaries of the polygon-defined geolocation area;

based on the received data defining the boundaries of the polygon-defined geolocation area, extracting coordinates of the at least one polygon-defined geolocation area;

based on the extracted coordinates of the at least one polygon-defined geolocation area, determine at least one a polygon;

based on geolocation data of network elements stored in a network element service database, receiving coordinates defining the geolocation of at least one network element;

for each network element and for each polygon, comparing the coordinates of the at least one network element with the extracted coordinates defining the boundaries of the polygon-defined geolocation area;

based on the comparison, determining for each polygon, that the geolocation of the at least one network element intersects with the polygon-defined geolocation area;

based on the determination, for each polygon, outputting the at least one intersecting network element of the polygon.

10. The method as claimed in claim 9, wherein while receiving the data defining the boundaries of the polygon-defined geolocation area, the method further comprises:

receiving a data file comprising geolocation data of the at least one polygon-defined geolocation area;

extracting coordinates of the at least one polygon-defined geolocation area from the geolocation data of the data file.

11. The method as claimed in claim 10, wherein while receiving the data file comprising geolocation data of the at least one polygon-defined geolocation area, the method further comprises:

evaluating the data file format of the received the data file comprising geolocation data of the at least one polygon-defined geolocation area;

determining that the data file comprising geolocation data of the at least one polygon-defined geolocation area is not a Keyhole Markup Language (KML) data file;

converting the geolocation data of the at least one polygon-defined geolocation area to a KML data file;

extracting coordinates of the at least one polygon-defined geolocation area from the geolocation data of the KML data file.

12. The method as claimed in claim 9, wherein while receiving the data defining the boundaries of the polygon-defined geolocation area, the method further comprises:

receiving data defining the boundaries of the polygon-defined geolocation area from a graphic user interface;

extracting coordinates from the received data defining the boundaries of the polygon-defined geolocation area.

13. The method as claimed in claim 9, wherein while outputting the at least one intersecting network element of the polygon, for each polygon, the method further comprises:

receiving, for each polygon, at least one polygon identification data;

based on the received at least one polygon identification data, storing the polygon comprising the coordinates of the polygon-defined geolocation area and the at least one intersecting network element of the polygon to a spatial database.

14. The method as claimed in claim 9, wherein while extracting the coordinates defining the boundaries of the polygon-defined geolocation area, the at least one processor is further configured to execute the instructions to:

determining two or more polygons based on the extracted coordinates of two or more polygon-defined geolocation areas;

creating a separate thread for each of the two or more polygons;

for each separate thread, comparing, for each network element, the coordinates of the at least one network element with the extracted coordinates defining the boundaries of the polygon-defined geolocation area in the thread.

15. A non-transitory computer-readable recording medium having recorded thereon instructions executable by at least one processor configured to perform a method for implementing geolocation-based polygon analysis to determine network elements of a telecommunications network in a polygon-defined geolocation area, the method comprising:

based on at least one geolocation area defined by polygonal shape, receiving data defining the boundaries of the polygon-defined geolocation area;

based on the received data defining the boundaries of the polygon-defined geolocation area, extracting coordinates of the at least one polygon-defined geolocation area;

based on the extracted coordinates of the at least one polygon-defined geolocation area, determine at least one a polygon;

based on geolocation data of network elements stored in a network element service database, receiving coordinates defining the geolocation of at least one network element;

for each network element and for each polygon, comparing the coordinates of the at least one network element with the extracted coordinates defining the boundaries of the polygon-defined geolocation area;

based on the comparison, determining for each polygon, that the geolocation of the at least one network element intersects with the polygon-defined geolocation area;

based on the determination, for each polygon, outputting the at least one intersecting network element of the polygon.

16. The non-transitory computer-readable recording medium as claimed in claim 15, wherein while receiving the data defining the boundaries of the polygon-defined geolocation area, the method further comprises:

receiving a data file comprising geolocation data of the at least one polygon-defined geolocation area;

extracting coordinates of the at least one polygon-defined geolocation area from the geolocation data of the data file.

17. The non-transitory computer-readable recording medium as claimed in claim 16, wherein while receiving the data file comprising geolocation data of the at least one polygon-defined geolocation area, the method further comprises:

evaluating the data file format of the received the data file comprising geolocation data of the at least one polygon-defined geolocation area;

determining that the data file comprising geolocation data of the at least one polygon-defined geolocation area is not a Keyhole Markup Language (KML) data file;

converting the geolocation data of the at least one polygon-defined geolocation area to a KML data file;

extracting coordinates of the at least one polygon-defined geolocation area from the geolocation data of the KML data file.

18. The non-transitory computer-readable recording medium as claimed in claim 15, wherein while receiving the data defining the boundaries of the polygon-defined geolocation area, the method further comprises:

receiving data defining the boundaries of the polygon-defined geolocation area from a graphic user interface;

extracting coordinates from the received data defining the boundaries of the polygon-defined geolocation area.

19. The non-transitory computer-readable recording medium as claimed in claim 15, wherein while outputting the at least one intersecting network element of the polygon, for each polygon, the method further comprises:

receiving, for each polygon, at least one polygon identification data;

based on the received at least one polygon identification data, storing the polygon comprising the coordinates of the polygon-defined geolocation area and the at least one intersecting network element of the polygon to a spatial database.

20. The non-transitory computer-readable recording medium as claimed in claim 15, wherein while extracting the coordinates defining the boundaries of the polygon-defined geolocation area, the method further comprises:

determining two or more polygons based on the extracted coordinates of two or more polygon-defined geolocation areas;

creating a separate thread for each of the two or more polygons;

for each separate thread, comparing, for each network element, the coordinates of the at least one network element with the extracted coordinates defining the boundaries of the polygon-defined geolocation area in the thread.

\* \* \* \* \*